US006839976B2

(12) United States Patent
Winkenbach et al.

(10) Patent No.: US 6,839,976 B2
(45) Date of Patent: Jan. 11, 2005

(54) STAND FOR MANUFACTURING BICYCLES

(76) Inventors: Laurent Winkenbach, Communal 9, CH-2400 Le Locle (CH); Alessandro Ferraroli, Via delle Rose 16, CH-6963 Pregassona (CH)

( * ) Notice: Subject to any disclaimer, the term of this patent is extended or adjusted under 35 U.S.C. 154(b) by 0 days.

(21) Appl. No.: 10/363,423

(22) PCT Filed: Aug. 30, 2001

(86) PCT No.: PCT/IB01/01565

§ 371 (c)(1), (2), (4) Date: Jun. 17, 2003

(87) PCT Pub. No.: WO02/18105

PCT Pub. Date: Mar. 7, 2002

(65) Prior Publication Data

US 2004/0088845 A1 May 13, 2004

(30) Foreign Application Priority Data

Aug. 31, 2000 (CH) .................................... 2000-1695/00

(51) Int. Cl.[7] ................................................ G01B 5/00
(52) U.S. Cl. ........................................... 33/549; 33/288
(58) Field of Search .......................... 33/549, 555, 608, 33/288

(56) References Cited

U.S. PATENT DOCUMENTS 4,432,144 A * 2/1984 Carlsson ...................... 33/608
4,868,993 A * 9/1989 Kvale .......................... 33/608
5,024,002 A * 6/1991 Possati ........................ 33/549
5,694,699 A * 12/1997 Folson ........................ 33/645
5,737,073 A * 4/1998 Wente et al. ................. 33/288
6,658,750 B2 * 12/2003 Scheibner et al. ............ 33/288

FOREIGN PATENT DOCUMENTS

| | | |
|---|---|---|
| CH | 1983/99 | 1/2000 |
| DE | 40 40 953 | 7/1992 |
| DE | 44 27 343 | 1/1995 |
| FR | 2 421 788 | 11/1979 |
| FR | 2 470 848 | 6/1981 |
| FR | 2 472 503 | 7/1981 |

* cited by examiner

*Primary Examiner*—Diego Gutierrez
*Assistant Examiner*—Madeline Gonzalez
(74) *Attorney, Agent, or Firm*—McGlew and Tuttle, P.C.

(57) ABSTRACT

The invention concerns a stand for manufacturing bicycle, of the type comprising in particular: a frame (1), handlebars (3), a fork (2), a handlebar extension (4), for fixing the handlebars (3) on the fork (2), mounted mobile on the frame (1), a crankset (7) provided with a shaft, a saddle (5), a seat tube (6) for mounting the saddle (5) on said frame (1). The invention is characterised in that the bench comprises a table (10) bearing first (16) and second (18) means for fixing the bicycle and a measuring device (20) for determining at least one characteristic dimension of the bicycle.

17 Claims, 11 Drawing Sheets

STAND FOR MANUFACTURING BICYCLES

FIELD OF THE INVENTION

The present invention relates to a stand for manufacturing bicycles of the type comprising in particular:

a frame a handlebar a fork a handlebar stem for fixing the handlebar to the fork and mounting it mobile on the frame, a crankset mounted mobile on the frame, a saddle, and a seat post for fixing the saddle on the frame.

BACKGROUND OF THE INVENTION

A bicycle has to be dimensioned such that it fits the morphology of its user. In most cases, the salesperson uses his know-how without relying on any particular technical means. He simply checks that his client has a satisfactory position on the bicycle.

Bicycles made for frequent use are manufactured from industrially produced parts that are assembled in a craftsman-like manner. The manufacturer measures the user and selects the best suited parts from among the existing parts, on the basis of tables. The mobile parts such as the handlebar and saddle are then fitted to the user.

Despite these measures, it has become apparent that, when this sport is practised intensively, it is desirable to determine the dimensions of the bicycle even more precisely. These dimensions can be determined, by antropometry, for example by means of the apparatus disclosed in Swiss Patent No. CH 1983/99, entitled "Antropometric Measuring Device", and/or by means of a dynamometric bicycle such as that marketed by Ergomotion, Lugano, Switzerland by the name of "DynaOne". By this method, it is possible to determine the optimum dimensions of the bicycle. However, it is not easy to guarantee such dimensions during assembly of series produced constituent parts and even during made-to-measure manufacture.

SUMMARY OF THE INVENTION

Indeed, bicycle adjustment is generally carried out using simple tools such as rulers or bevel protractors. The accuracy thereby obtained is mediocre. It has become apparent that inadequate adjustment could lead to health problems for the user, especially when he or she practices the sport intensively. It is an object of the present invention to propose a high performance tool, for checking the rigid parts and positioning the mobile parts constituting a bicycle, such that it is better fitted to its user.

The stand therefore includes a table and first and second means for securing the bicycle to the table. The table further supports a measuring device for determining at least one characteristic dimension of the bicycle. Thus, due to the fact that the measuring device is directly carried by the table to which the bicycle is secured, it is possible to guarantee a high level of accuracy in determining the dimensions of the bicycle.

Advantageously, the measuring device includes a sliding block mounted so as to slide on the table and an arm mounted so as to pivot on the sliding block. It is thus possible to place the device at right angles to the crankset and arrange the arm so as to be able to measure the height of the crank axle, the height of the saddle, the angle of the seat tube and the height of the frame. Moreover, since the arm is mounted so as to pivot on the sliding block, it is possible to measure the inclination of the seat tube.

In order to facilitate measuring the height of the crank axle, the arm is provided with connecting means for co-operating with the housing of the crankshaft to secure them to each other. It further includes a rule and a probe or feeler pin for measuring the height of the saddle with reference to the crankshaft axle.

Measurement of the length of the frame and the dimensions relating to the handlebar and its handlebar stem, is facilitated by the fact that the stand further includes two posts fixed to the table and a crosspiece mounted so as to slide on the posts.

Advantageously, each of the posts is provided with a rule for measuring the position of the crosspiece. Moreover, the crosspiece bears a rule and a sliding block provided with a fork, for measuring the position of the handlebar stem and the handlebar.

BRIEF DESCRIPTION OF THE DRAWINGS

Other features and advantages of the invention will appear from the following description, made with reference to the annexed drawing, in which.

DESCRIPTION OF A PREFERRED EMBODIMENT

Figure 1:
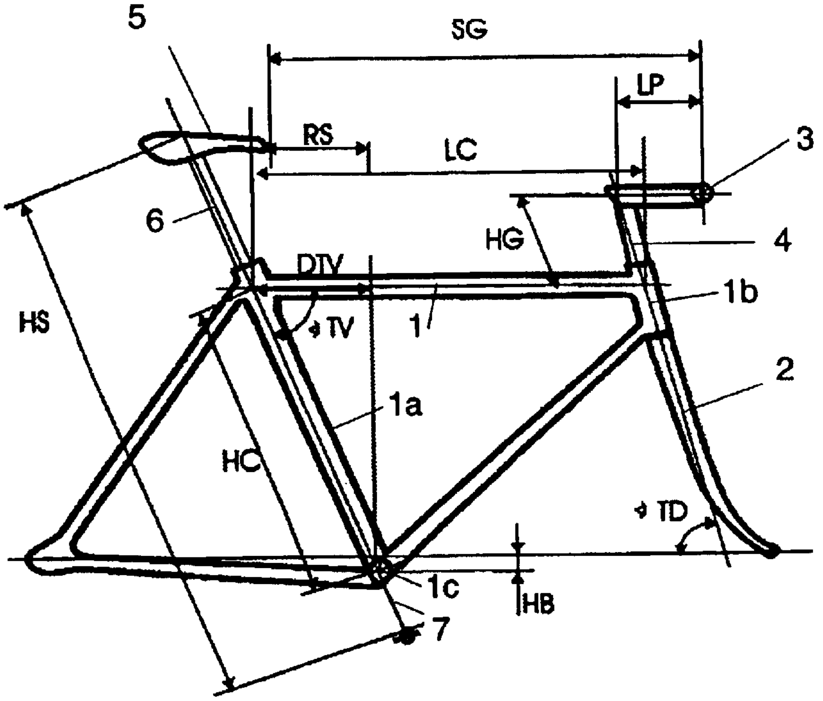
FIG. 1 shows, schematically, a bicycle on which the important dimensions are indicated to ensure that the bicycle conforms to its user.

FIG. 1 shows schematically a bicycle including a frame 1 provided, in particular, with a seat tube 1*a* and a head tube 1*b*, a fork 2 engaged in head tube 1*b*, a handlebar 3, a handlebar stem 4 bearing handlebar 3 and engaged in head tube 1*b* and secured to fork 2 in a manner known to those skilled in the art, such that the handlebar and the fork can be rotated together on frame 1, a saddle 5, a seat post 6 bearing saddle 5 and engaged in seat tube 1*a* to secure saddle rigidly 5 to frame 1, and a crankset 7.

This bicycle is characterized by the following dimensions, shown in FIG. 1:

height of the crankset axle (HB), saddle height (HS), seat tube angle (TV), seat tube offset (DTV), frame height (HC), frame length (LC), inclination of head tube (TD), handlebar stem height (HG), handlebar stem length (LP), retraction of saddle (RS), saddle—handlebar distance (SG).

Figure 2:
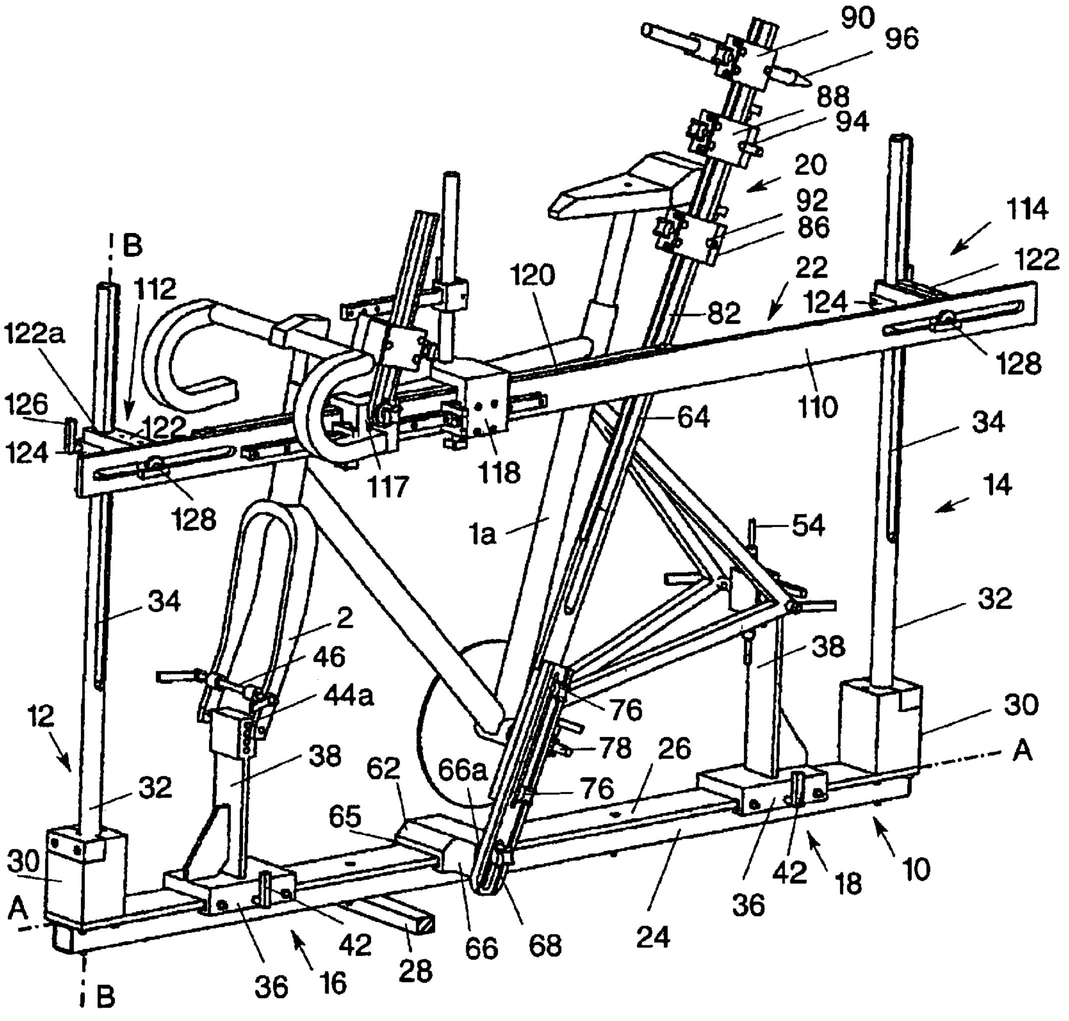
FIG. 2 is an overall view of a stand according to the invention.

The stand illustrated in FIG. 2 essentially includes a table 10, two posts 12 and 14, two supports 16 and 18, a measuring device 20 and a crosspiece 22.

Table 10 is formed of a square profile member 24 and a rod 26 of rectangular cross-section, fixed to profile member 24, which together define a longitudinal axis A—A. It is provided with a chassis 28, partially shown and intended to rest on the ground or on a workbench, and which includes conventional adjusting means, for defining the position of the stand, particularly its horizontal position. These means have not been shown to avoid overloading the drawing and the description.

Posts 12 and 14 each include a base 30, a mast 32 mounted on base 30, and a rule 34 fixed to mast 32. These various parts are assembled to each other and to table 10 by means of screws that have been partially shown in the drawing but have not been referenced. The mast of post 12 is oriented along a vertical axis B—B, perpendicular to axis A—A. The mast of post 14 is arranged parallel to axis B—B.

Supports 16 and 18 are both formed of a sliding block 36 and a supporting arm 38.

Figure 3:
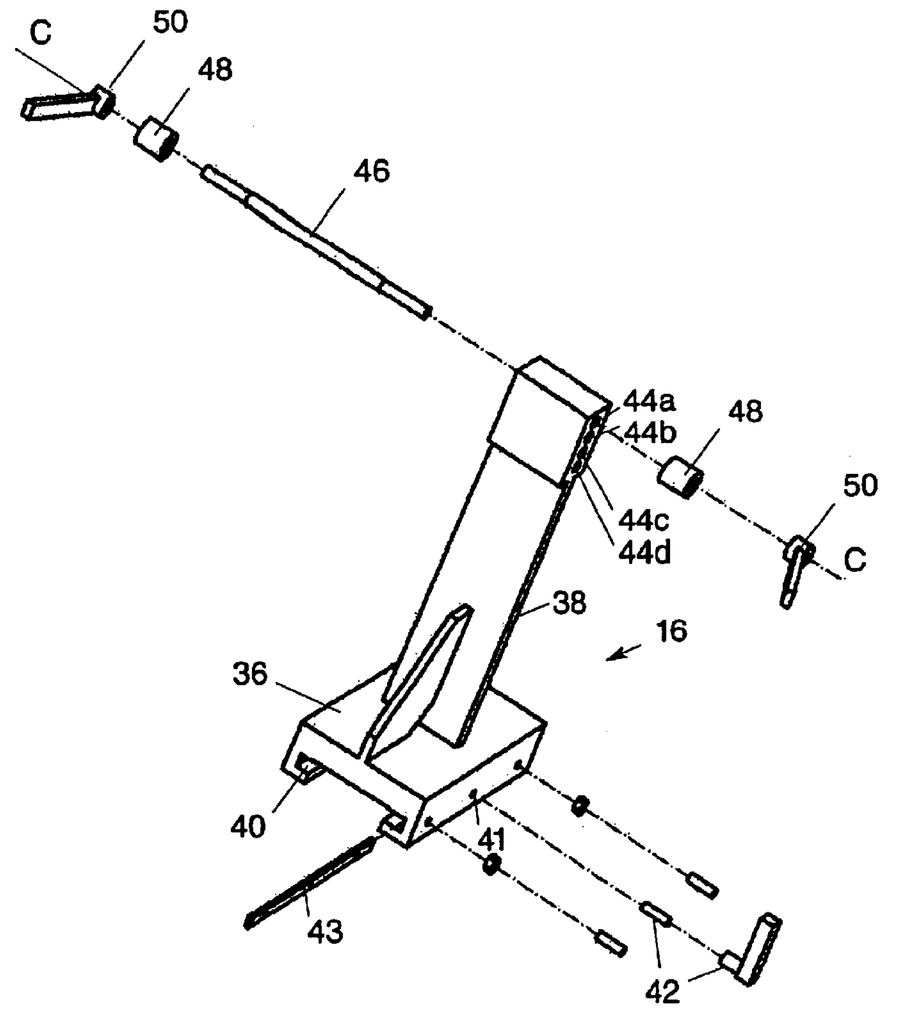
FIGS. 3 to 11 show, more precisely, certain parts of the stand of FIG. 2.
Figure 4:
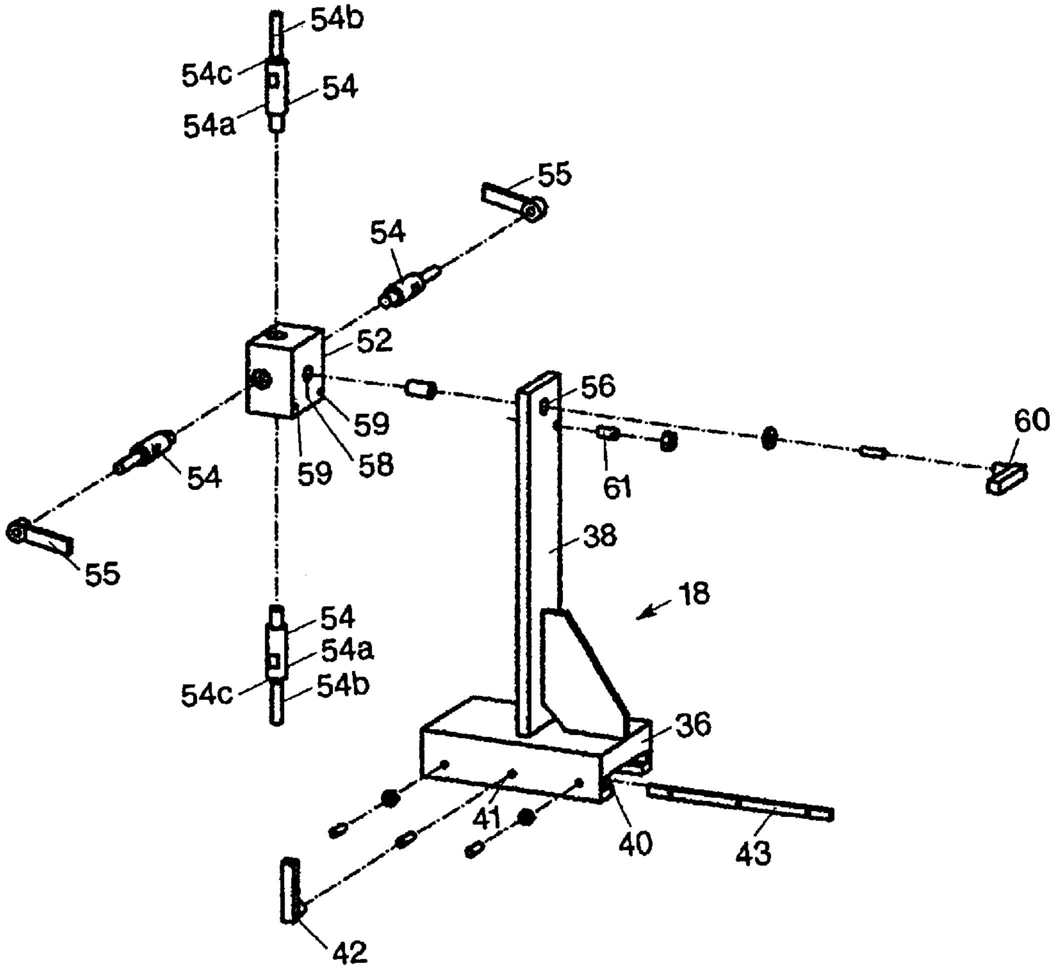

As can be seen in FIGS. 3 and 4, sliding block 36 is constructed so as to form a slide 40 to be engaged in rod 26, to allow support 16 or 18 to slide on table 10. It is provided with a threaded hole 41 and a tightening member 42, engaged in threaded hole 41. A shoe 43, extending along the side of slide 40 provided with threaded hole 41, is pressed against rod 26 by tightening member 42, to lock base 16 or 18 onto table 10. Pins, shown in the drawing, but not referenced, ensure the positioning of shoe 43 on sliding block 36.

Support 16, shown in detail in FIG. 3, is for fixing the bicycle via its front part, as will be explained hereinafter. For this purpose, its supporting arm 38 is provided with four cylindrical holes 44, whose axes are parallel to each other and identified by the letters a to d. A shaft 46, formed of a cylindrical rod, threaded at both of its ends, is engaged in one or other of holes 44. Shaft 46 defines a lateral axis C—C, perpendicular to axes A—A and B—B. It bears two adjustment rings 48, arranged on either side of supporting arm 38, and two tightening members 50, each screwed onto one of the threaded ends of shaft 46. It should be noted that, in FIG. 2, shaft 46 with rings 48 and tightening members 50 have been arranged above support 16, so as to allow its structure to be seen more clearly.

Support 18 is shown in more detail in FIG. 4. It is for fixing the bicycle via its back end, as will be explained hereinafter. Its supporting arm 38 bears a selector 52, of parallelepiped shape, provided on four of its sides with a fixing pin 54, these pins being in coaxial pairs, the pairs being perpendicular to each other. Pins 54 have a body *54a* and a finger-piece *54b* whose end is threaded. Tightening members 55 can be screwed thereon.

Body *54a* is connected to finger-piece *54b* by a shoulder *54c*. The two pairs of pins 54 have different distances between their two shoulders *54c*, the pins used being selected as a function of the features of the frame.

Supporting arm 38 is provided with a hole 56 oriented along a parallel axis to axis A—A. Selector 52 is pierced with a threaded hole 58 and two positioning holes 59. A tightening member 60, for securing the supporting arm to the selector, is engaged in hole 56 and screwed into hole 58. A stud 61, engaged in an unreferenced hole of supporting arm 38, co-operates with one or other of holes 59 to position selector 52 on support 18.

As can be seen in FIG. 2, measuring device 20 includes a sliding block 62 and an arm 64.

Sliding block 62 forms a slide 65 arranged so as to be engaged on rod 26 and a projecting part 66 whose face *66a* is pierced with a threaded hole, oriented parallel to axis C—C and into which a thumb screw tightening device 68 is screwed. Face *66a* is plane and acts as a support for arm 64, as explained hereinafter.

Figure 5:
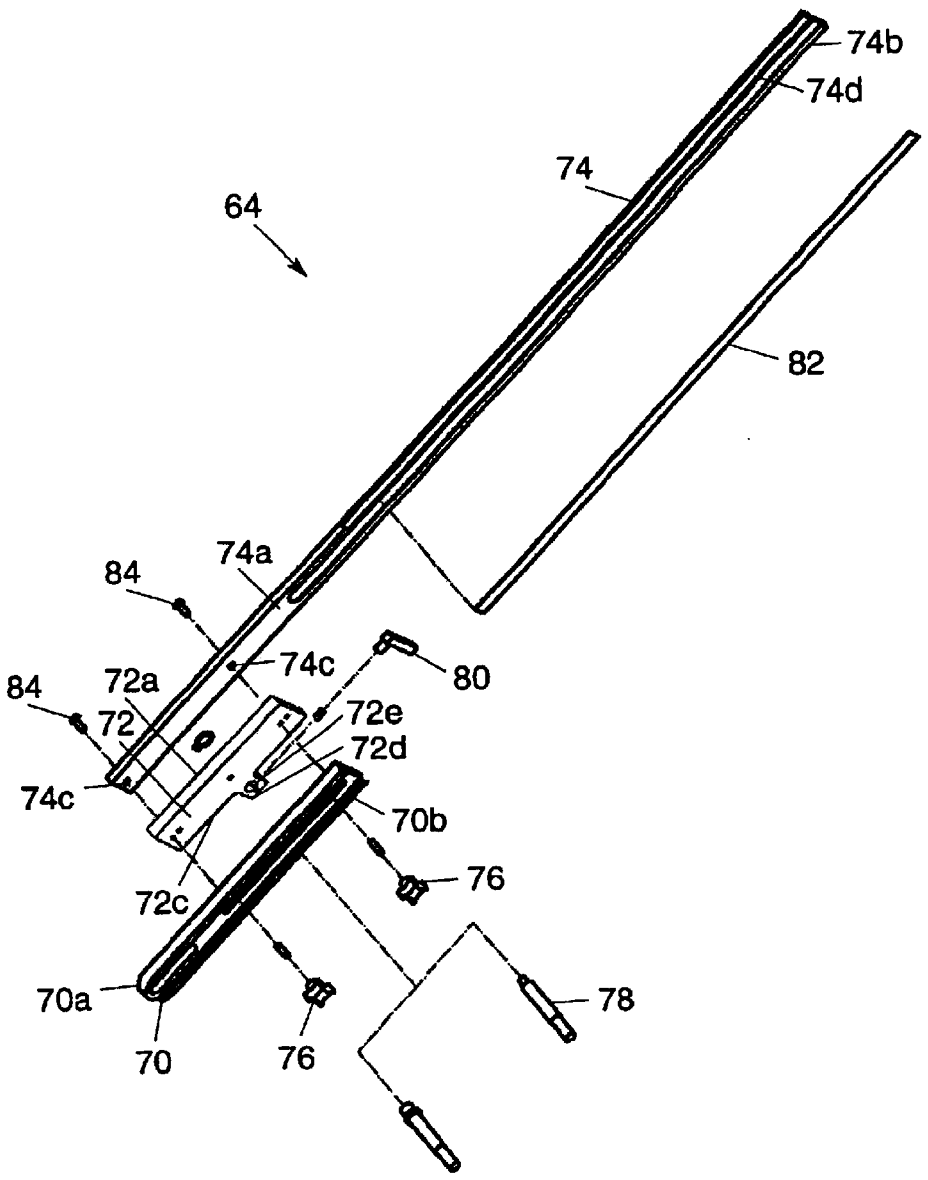

Arm 64, shown in detail in FIG. 5, includes a lever 70, a crankset plate 72 and a bar 74, assembled to each other by means of two thumb screw tightening devices 76.

The function of lever 70 is to ensure the pivoting assembly of arm 64 on sliding block 66. It is formed of a bar of rectangular cross-section, including two recesses 70 and *70b*, which extend along the same line as each other. Recess *70a*, which is the shorter, is for ensuring the connection of arm 64 to sliding block 62 by engaging thumb screw tightening device 68.

Crankset plate 72 is of generally parallelepiped shape, with a large face *72a* adjacent to bar 74 and in which a groove is made, not visible in the drawing, in which bar 74 is engaged and positioned, and a lateral face *72c* provided with a finger-piece *72d*.

Finger-piece *72d* includes a first cylindrical hole *72e*, oriented parallel to axis C—C and intended to receive a stud 78 whose function will be specified hereinafter. It is provided with a slit extending over the entire length of hole *72e*, and a second hole, perpendicular to the slit and divided by the latter into two portions, one of which is threaded. This second hole acts as a housing for a tightening member 80.

Plate 72 is also pierced with two pairs of threaded holes, one of which is for receiving the screws of thumb screw tightening devices 76. The function of the holes of the second pair will be specified hereinafter.

Bar 74 is of generally parallelepiped shape, one face *74a* of which is provided with a groove *74b* extending over ¾ of its length as far as its free end and in which a rule 82 is housed. It includes, at its other end, a pair of holes *74c* in which screws 84 are engaged, these screws being tightened in the holes of the second pair of crankset plate 72, to ensure that it is rigidly fixed onto bar 74. One of the longitudinal edges adjacent to groove *74b* has a bezel *74d* whose function will be specified hereinafter.

Measuring device 20 further includes three runners 86, 88 and 90 visible in FIG. 2. Runners 86 and 88 respectively bear probes 92, 94, whereas runner 90 acts as a support for two probes bearing the references 95 and 96, for measuring certain dimensions of the bicycle, as will be explained hereinafter. Only runner 90 is described in detail hereinafter, with reference to FIG. 6. The two others will be described with reference to FIG. 11.

Figure 6:
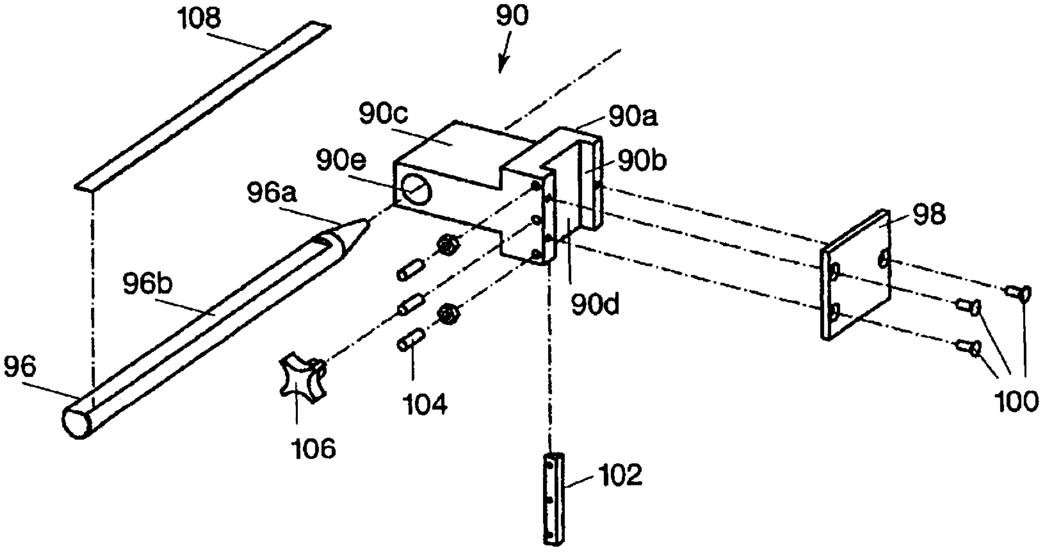

As FIG. 6 shows, runner 90 is formed of a body *90a*, of generally parallelepiped shape, provided, on one of its large faces, with a groove *90b* and with a projecting portion *90c* on the other large face.

Groove *90b* is closed by means of a plate 98, fixed to the body by means of screws 100, to form a slide *90d* for receiving bar 74. Runner 90 is also provided, on one of the walls of groove *90b*, with a shoe 102, with pins 104 secured to the shoe and a thumb screw tightening device 106, engaged in body *90a* of the runner, to form together and in a conventional manner, a system for locking runner 90 onto bar 74. Projecting portion *90c* is provided with a hole *90e* in which probe 96 is engaged. An elastic member, arranged in hole *90e* and not visible in the drawing, ensures the positioning of probe 96. It would also be possible to fix it by means of a tightening member or a thumb screw tightening device.

Probe 96 is formed of a cylindrical tube, one end *96a* of which is conical. It is provided with a flat portion *96b* on which a ruler 108 is placed, for example by bonding.

With reference to FIG. 2, it is clear that cross-piece 22 is essentially formed of a bar 110 of substantially rectangular cross-section and two connecting studs 112 and 114, for fixing cross-piece 22 in a removable manner, onto posts 12 and 14.

Figure 7:
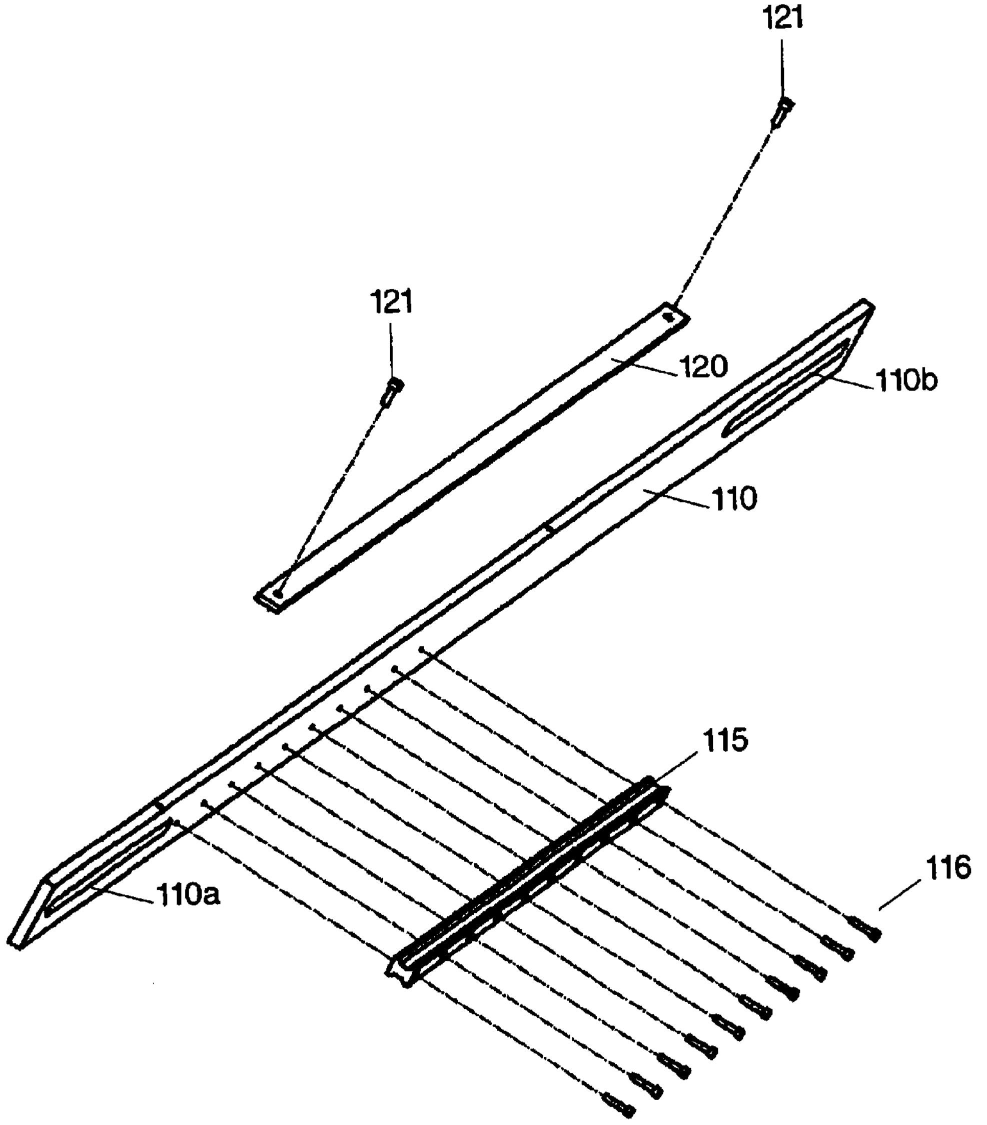

As is visible in FIG. 7, bar 110 includes two recesses 110*a* and 110*b*, arranged longitudinally at each of its ends and open over its large faces, respectively facing posts 12 and 14. It bears a rail 115, fixed to one of its large faces, in the extension of recess 110*a* by means of screws 116. Rail 115 carries two runners 117 and 118 (FIG. 2). The rail and the runners are made by means of an assembly sold by Hoerbiger (Switzerland) under the reference RK-FD 15S.

A rule 120 is mounted on bar 110, on its top lateral face, arranged such that it extends forwards short of the handlebar and backwards beyond the seat tube and is fixed by means of screws 121.

Connecting studs 112 and 114 (FIG. 2) both include a body 122 pierced with a cylindrical hole 122*a* in which mast 32 is engaged. A mobile part 124, fixed to body 122 by means of a tightening member 126, locks studs 112 and 114 onto masts 32 in a conventional manner, in order to secure them to each other. Bodies 122 are provided with a threaded hole whose axis is parallel to axis C—C and made in the end opposite to the side provided with hole 122*a*, arranged such that it is located facing recesses 110*a* or 110*b* for receiving a tightening member 128.

Tightening members 128 of studs 112 and 114 are respectively engaged in recesses 110*a* and 110*b* and secure bar 110 to studs 112 and 114 in a removable manner.

Figure 8:
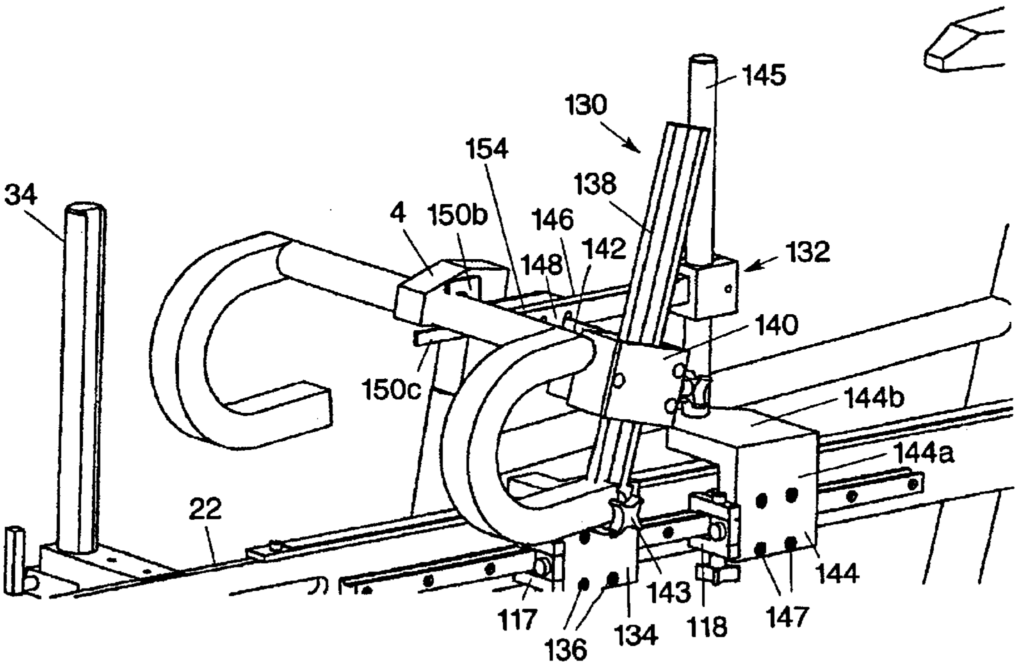

Runners 117 and 118 respectively bear measuring tools 130 and 132 shown in FIG. 8.

Measuring tool 130 includes a support 134 rigidly fixed onto runner 117, by means of screws 136, a bar 138, a runner 140 and a probe 142. Bar 138 has a comparable structure to bar 74, but its length is smaller. It is fixed to support 134 by means of a thumb screw tightening device 143 in a similar way to the manner in which lever 70 is secured to sliding block 60. Runner 140 is mounted on bar 138 in the same way that runner 96 is mounted on bar 74. This is why these different parts will not be described in more detail here.

Figure 9:
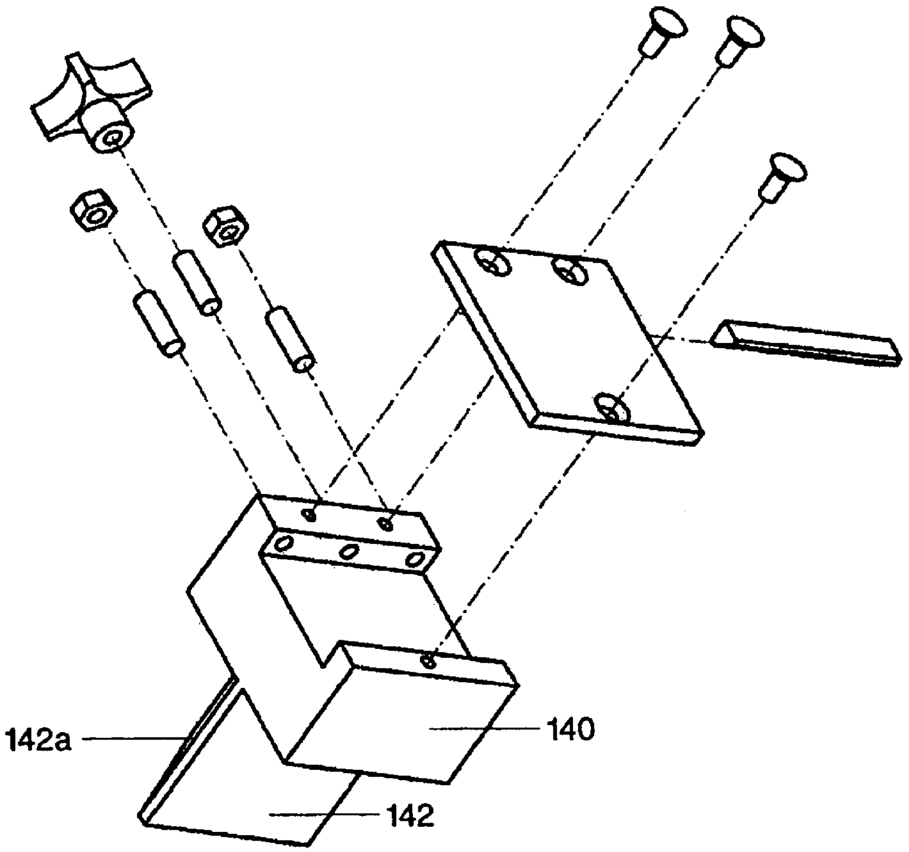

Probe 142, illustrated in FIG. 9, is integral with the body of runner 140. It has the shape of a prism, one edge 142 of which is oriented upwards.

Measuring tool 132 visible in FIG. 8, is formed of a set square-shaped support 144 with two arms 144*a* and 144*b*, a mast 145 and a fork 146. Arm 144*a* is rigidly fixed to runner 118 by means of screws 147. Arm 144*b* extends above crosspiece 22 and carries cylindrical mast 145 at its end, secured, for example by being driven into support 144.

Figure 10A:
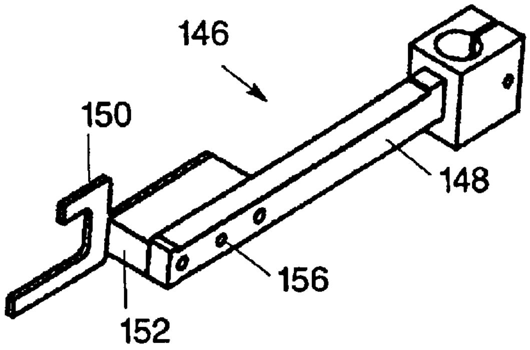
Figure 10B:
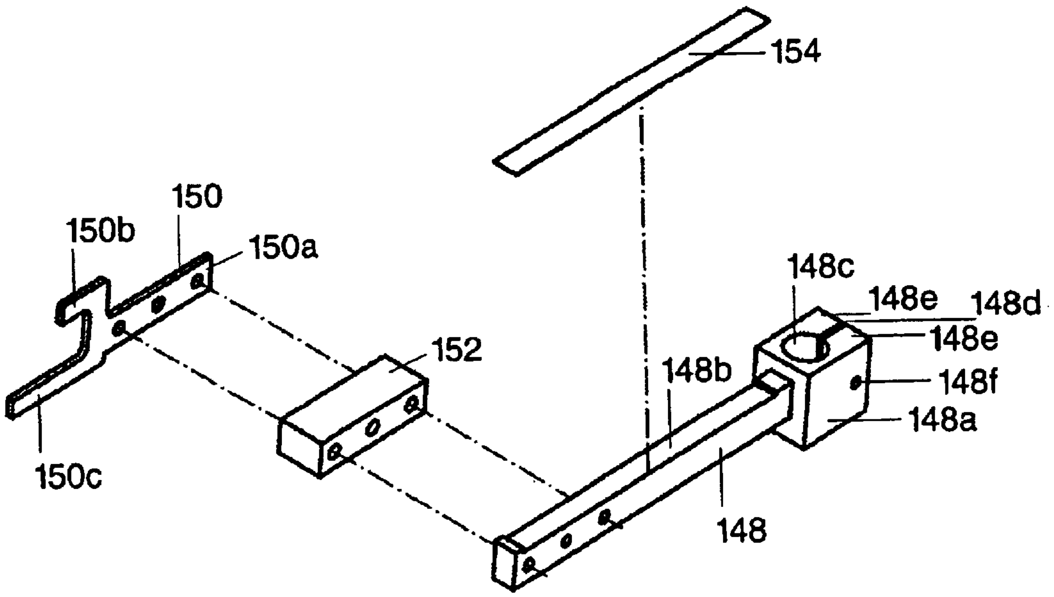

Fork 146 is shown in perspective in FIG. 10, assembled at a and exploded at b. It includes an arm 148, a hand 150, an offset member 152 and a rule 154. Arm 148 is formed of a slit sleeve 148*a* and a stem 148*b*.

Sleeve 148*a* includes a central aperture 148*c*, for receiving mast 145 and a slit 148*d*, opening into aperture 148*c* and forming two lips 148*e*. A hole 148*f* perpendicular to slit 148*d* passes through the two lips 148*e* and forms two portions, one of which is threaded. A tightening member, which is not visible in the drawing, is engaged in the non-threaded portion and screwed into the threaded portion of hole 148*f*, in order to tighten arm 148 onto mast 145.

Hand 150 includes a wrist-piece 150*a* and two horizontal finger-pieces 150*b* and 150*c* arranged parallel to each other and in the extension of wrist-piece 150*a*. The distance between finger-pieces 150*b* and 150*c* is equal to the diameter of the tube forming handlebar 3. The top face of bottom finger-piece 150*c* is located in the extension of the bottom face of stem 148*b*.

Offset member 152 is of parallelepiped shape, inserted between the free end of stem 148*b* and wrist-piece 150*a*, which are aligned along a direction parallel to axis C—C. Stem 148*b*, wrist-piece 150*a* and offset member 152 are all pierced with holes in which screws 156 are engaged in order to assemble fork 146.

Stem 148*b* bears, on its top face, rule 154, which is advantageously fixed by bonding.

Figure 11:
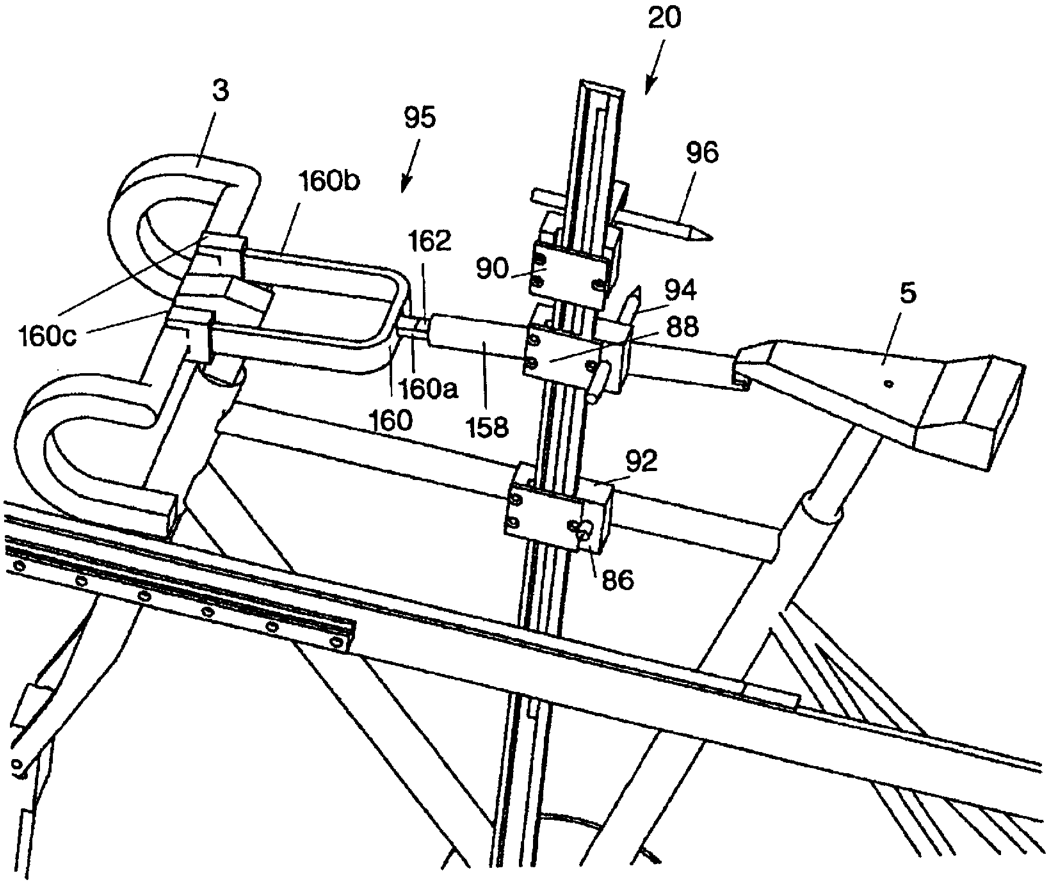

FIG. 11 shows measuring device 20, its runners 86, 88 and 90 and its probes 92, 94, 95 and 96 in more detail.

Probe 92, integral with runner 86, is comparable to probe 142 described with reference to FIG. 9, the edge being however oriented downwards.

As explained hereinbefore, runner 88 bears two probes 94 and 95. Probe 94 is a stem comparable to that forming probe 96. It is, however, arranged on runner 88 such that it is oriented parallel to axis C—C.

Probe 95 includes a tube 158 oriented parallel to axis A—A and fixed to runner 88 by means of a tightening member that is not visible in the drawing. Tube 158 bears a graduation which has not been shown in the drawing and which allows certain dimensions to be measured, as will be explained hereinafter. A fork 160, formed of an arm 160*a* engaged in tube 158 and a U-shaped part 160*b*, each of the ends of the U being provided with two finger-pieces 160*c*, arranged such that finger-pieces 160*c* can be engaged against the head tube, on either side of the handlebar stem. Arm 160*a* is provided with a flat portion oriented upwards, on which a ruler 162 is fixed.

In order properly to use a stand like the one that has just been described, one also needs to have an electronic spirit level, of the type allowing angles to be determined as a function of the horizontal. This spirit level can be of any type available on the market.

The first operation consists in adjusting table 10. For this purpose, the spirit level is placed on rod 26 and chassis 28 is levelled such that the table is perfectly horizontal. In this position posts 12 and 14 are, by construction, vertical.

Supports 16 and 18 are arranged such that, when shaft 46 of support 16 is engaged in hole 44*a*, it is at the same distance from table 10 as pins 54 of support 18. In other words, a plane passing through the axes of shaft 46, engaged in hole 44*a*, and pins 54 is horizontal, since it is parallel to the surface of rod 26.

The bicycle can then be placed on the stand, as shown in FIG. 2. More precisely, tightening members 42 are loosened, such that supports 16 and 18 can be moved on table 10. Fork 2 is mounted on support 16 by its ends, which are arranged for receiving the hub of the front wheel, shaft 46 playing the role of the latter. Likewise, the frame is adjusted on support 18 by its members for receiving the hub of the back wheel. It is fixed onto pins 54, the position of selector 52 being selected such that shoulders 54*c* allow frame 1 to be positioned on its support.

If the front wheel of the bicycle is of the same diameter as the back wheel, shaft 46 is engaged in hole 44*a*. Consequently, the bicycle is in a position corresponding to that which it would have on a flat horizontal road.

If the front wheel was of smaller diameter than the back wheel, this difference would be compensated for by choosing one of holes 44*b* to 44*d*, such that the bicycle is also in a position corresponding to that which it would have on a flat horizontal road.

Measuring device 20 is then fitted to the bicycle. Thumb screw tightening device 68 is thus loosened, so that sliding block 62 can slide on table 10. Arm 64 is then adjusted such that hole 72*e* is opposite the support of crankset 1*c*. Stud 78 can then be engaged in hole 72*e* and in crankset support 1*c*, tightening member 80 then being tightened, such that stud 78 is rigidly fixed to the crankset plate. Stud 78 is dimensioned such that it can pivot freely in crankset support 1_c_ with minimal play.

The spirit level is then applied against arm 64, in order to place the latter vertically. When this adjustment has been made, thumb screw tightening devices 68 and 76 are tightened.

Studs 122 are then adjusted such that they are at the same arbitrary height, for example 300 mm, measured on rules 34, then fixed by tightening members 126. Bar 110 is then set in place on studs 122, by means of tightening members 128. It is parallel to table 10 if the two heights of studs 122 are equal. This means that bar 110 is horizontal. The height of the crank axle HB can then be determined by subtracting, from the height of studs 122, read on rule 34, the value read on rule 82, where it intersects bar 110.

The next operation consists in checking the inclination TV of seat tube 1_a_ and the height of saddle 5. The latter is engaged in seat tube 1_a_, tightened such that it can be moved with no effort.

The measuring device is inclined such that it is oriented parallel to seat tube 1_a_. Runner 88 is moved on bar 74, until probe 94 is at theoretical saddle height HS. This reading is made on rule 82. More precisely, the value read is equal to the saddle height HS less the length of the cranks of crankset 7 which is also measured. Saddle 5 is then brought into contact with probe 94.

The inclination of seat tube TV can be checked either by using the spirit level, or by trigonometry.

If the measured value is different from the theoretical value, the measuring device is brought into the theoretical position, and the saddle is moved forwards or backwards, depending on the correction made. Consequently, although the frame does not correspond perfectly to the theoretical inclination, moving saddle 5 in a parallel direction to axis A—A allows this fault to be corrected. The correction must not, however, exceed certain limits, depending on the weight of the user, because of the torque that the saddle undergoes, the user's weight no longer being directly applied to the seat post. If necessary, saddle height HS can be adjusted again.

The handlebar position and particularly the handlebar stem height HG is adjusted by placing crosspiece 22 such that it corresponds to the theoretical height HC of the frame. Measuring device 20 is thus held in its position forming an angle TV with the horizontal and runner 88 is moved on bar 74 until the dimension corresponding to HC is reached. Cross-piece 22 is then moved upwards on masts 32, such that it rests against probe 94. It is thus at the desired height. Crosspiece 22 is then adjusted along a parallel direction to axis A—A, such that the beginning of rule 120 is opposite the conical end of probe 94.

The following part of the description refers to FIG. 8. Measuring tool 130 is then adjusted such that bar 138 forms, with the horizontal, an angle equal to head tube angle TD. It is placed on bar 110 at the dimension equal to frame length LC. Runner 140 is moved on bar 138 to a height corresponding to height HG of handlebar stem 4. Fork 146 is then brought to rest on edge 142_a_ of probe 142. Consequently, the top face of bottom finger-piece 150_c_ is at the desired height. Runners 117 and 118 and measuring tools 130 and 132 are locked. By loosening tightening members 128, it is possible to move bar 110 along axis A—A, while sliding handlebar stem 4 in tube 1_b_, until handlebar 3 can be inserted between finger-pieces 150_b_ and 150_c_, as shown in FIG. 8. Handlebar 3 is then at the right height. The point of intersection of bar 138 with arm 148 allows the handlebar stem length LP to be read on rule 154. Reading is facilitated by the fact that edge 142_a_ of probe 142 is opposite rule 154.

The next operations, explained with reference to FIG. 11, allow the saddle retraction RS and the saddle-handlebar distance SG to be determined. In order to do this, measuring device 20 is again placed vertically, adjustment being carried out by means of the spirit level. Runner 88 is brought to the height of saddle 5, then tube 158 is inserted therein, such that by sliding, it comes to rest via its end against the point of saddle 5. The tube is then locked by means of the tightening member that is not visible in the drawing. The graduation borne by tube 158 then allows the saddle retraction value RS to be read.

Fork 160 is then introduced into tube 158 and the runner adjusted in height on bar 74 such that finger-pieces 160_c_ are engaged on either side of the horizontal tube of handlebar 3 and U-shaped part 160_b_ are stopped against the tube. It is then possible to read the saddle-handlebar distance SG on ruler 162.

It is clear from the foregoing description that the stand that has just been described allows, via its principles, virtually all the parameters of the bicycle being assembled and/or checked to be adjusted. It is evident that measurement of the various parameters of the bicycle can be envisaged on the basis of other similar structures, without thereby departing from the scope of the invention.

It is thus possible to replace the rules with optical readers and to carry out all of the measurements by electronic means.

It is also possible to integrate bevel protractors or spirit levels for example in table 10, cross-piece 22 or measuring device 20, such that it is not necessary to rely on a tool independent from the stand.

It is also possible to optimise an existing bicycle so that it is as well fitted as possible to the user, without however making any significant modifications to the bicycle, for example by adapting saddle 5 or by changing handlebar stem 4.

What is claimed is:

1. A stand ear manufacturing bicycles of the type comprising:

a frame, a handlebar, a fork, a handlebar stem for fixing the handlebar to the fork and mounting it mobile on the frame, a crankset provided with a shaft and a crankshaft recess, a saddle, and a seat post for mounting the saddle on said frame, wherein said stand includes a table bearing first means the securing the bicycle relative to the table and second means for securing the bicycle relative to the table and a measuring device for determining at least one characteristic dimension of said bicycle, wherein said measuring device includes a sliding block mounted so as to slide on said table and an arm mounted so as to pivot on said sliding block wherein said arm is provided with connecting means for engaging with the recess of said crankshaft.

2. A stand according to claim 1, wherein said arm is provided with a rule and a probe for measuring the position of the saddle with reference to the axle of said shaft.

3. A stand according to claim 2, further including two posts secured to said table and a crosspiece mounted so as to slide on said posts.

4. A stand according to claim 1, further including two posts secured to said table and a crosspiece mounted so as to slide on said posts.

5. A stand according to claim 4, wherein said posts are each provided with a rule (34) for measuring the height position of said cross-piece.

6. A stand according to claim 5, wherein said crosspiece carries a rule and a runner provided with a fork for measuring the position of the stem and the handlebar.

7. A stand according to claim 4, wherein said crosspiece carries a rule and a runner provided with a fork for measuring the position of the stem and the handlebar.

8. A stand for manufacturing a bicycle having a frame, a handlebar, a fork, a handlebar stem fixing the handlebar to the fork and mounting the handlebar on the frame, a crankset provided with a shaft and a recess, a saddle, and a seat post mounting the saddle on said frame, said stand comprising:

a table;

a first frame engaging means mounted on said table for engaging said frame for supporting said frame relative to said table;

a second frame or fork engaging means mounted movably on said table and fixable relative to said first frame engaging means for engaging said frame or said fork for supporting said frame relative to said table;

a measuring device for determining at least one characteristic dimension of said bicycle, said measuring device including a sliding block mounted so as to slide on said table and an arm mounted so as to pivot on said sliding block, said arm including connecting means for engaging the recess of said crankshaft for fixing a first measurement point of said measuring device.

9. A stand according to claim 8, wherein said arm is provided with a rule and a probe for measuring the position of the saddle with reference to said first measurement point.

10. A stand according to claim 8, further comprising:

a first post secured to said table;

a second post secured to said table;

a crosspiece mounted slidably on said first post and said second post.

11. A stand according to claim 10, further comprising: a first rule associated with said first post for setting the height position of said cross-piece along said first post; and a second rule associated with said second post for setting the height position of said cross-piece along said second post.

12. A stand according to claim 11, further comprising a measurement fork for measuring the position of the stem and the handlebar and a measuring rule, wherein said crosspiece carries a rule and a runner mounting said measurement fork movably for measuring the position of the stem and the handlebar.

13. A stand for manufacturing a bicycle having a frame with a rear axle mount, a handlebar, a fork connected to a front of the frame, a handlebar stem fixing the handlebar to the fork and mounting the handlebar on the frame, a crankset provided with a shaft and a shaft recess, a saddle, and a seat post mounting the saddle on said frame, said stand comprising:

a table;

a first sliding block mounted on said table and being fixable in a position along a length of said table;

a frame rear axle mount engaging part mounted on said first sliding block for engaging said rear axle mount for supporting a rear of the frame relative to said table;

a second sliding block mounted on said table and being fixable in a position along a length of said table;

a fork engaging part mounted on said second sliding block for engaging the fork for supporting a front of the frame relative to said table;

a third sliding block mounted on said table and being flexable in a position along a length of said table so as to slide on said table;

an arm pivotably mounted on said third sliding block, said arm having a location for establishing a first measuring point and for measuring a location relative to said first measuring point; and a connecting means connected to said arm and being positionable relative to said arm to establish said first measurement point of said arm, said connecting means for engaging the recess of said crankshaft to hold said crankshaft at said first measurement point of said arm.

14. A stand according to claim 13, further comprising a rule and a probe connected to said arm for measuring the position of the saddle with reference to said first measurement point.

15. A stand according to claim 14, further comprising;

a first post secured to said table;

a second post secured to said table;

a crosspiece mounted slidably on said first post and said second post.

16. A stand according to claim 15, further comprising: a first rule associated with said first post for setting the height position of said cross-piece along said first post; and a second rule associated with said second post for setting the height position of said cross-piece along said second post.

17. A stand according to claim 16, further comprising a measurement fork for measuring the position of the stem and the handlebar and a measuring rule, wherein said crosspiece carries a rule and a runner mounting said measurement fork movably for measuring the position of the stem and the handlebar.

* * * * *